US011005718B2

(12) United States Patent
Trim et al.

(10) Patent No.: US 11,005,718 B2
(45) Date of Patent: May 11, 2021

(54) DETERMINING CAPABILITIES OF COGNITIVE ENTITIES IN A DISTRIBUTED NETWORK BASED ON APPLICATION OF COGNITIVE PROTOCOLS

(71) Applicant: INTERNATIONAL BUSINESS MACHINES CORPORATION, Armonk, NY (US)

(72) Inventors: Craig M. Trim, Ventura, CA (US); Lakisha R. Hall, Upper Marlboro, MD (US); Gandhi Sivakumar, Bentleigh (AU); Kushal Patel, Pune (IN); Sarvesh Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 68 days.

(21) Appl. No.: 16/204,235

(22) Filed: Nov. 29, 2018

(65) Prior Publication Data

US 2020/0177463 A1    Jun. 4, 2020

(51) Int. Cl.
*G06F 15/177* (2006.01)
*H04L 12/24* (2006.01)
(Continued)

(52) U.S. Cl.
CPC ............ *H04L 41/12* (2013.01); *H04L 43/065* (2013.01); *H04L 45/54* (2013.01)

(58) Field of Classification Search
CPC ........ H04L 41/12; H04L 43/065; H04L 45/54
See application file for complete search history.

(56) References Cited

U.S. PATENT DOCUMENTS 6,021,113 A    2/2000   Doshi et al.
6,286,047 B1*  9/2001   Ramanathan ..... H04L 29/12066
                                                370/229
(Continued)

FOREIGN PATENT DOCUMENTS

CN         107222843         9/2017

OTHER PUBLICATIONS

Liu et al, "Adaptive Distributed Service Discovery for Dependable Service Integration", 2010 13th IEEE International Symposium on Object/Component/Service-Oriented Real-Time Distributed Computing Workshops (ISORCW), May 4-7, 2010, 6 pages.
(Continued)

*Primary Examiner* — Jonathan A Bui
(74) *Attorney, Agent, or Firm* — Brian Restauro; Andrew D. Wright; Roberts Calderon Safran & Cole. P.C.

(57) ABSTRACT

A computer-implemented method includes: detecting, by a computing device, a triggering of a discovery request event for discovering capabilities of each of a plurality of cognitive entities (CEs) in a distributed cognitive network; outputting, by the computing device, discovery requests to each of the plurality of CEs; receiving, by the computing device, respective responses to the discovery request from each of the plurality of CEs, wherein each respective response identifies capabilities of each of the plurality of CEs; generating, by the computing device, a capabilities mapping table based on the receiving the respective responses; and storing, by the computing device, the capabilities mapping table to process a pending or future service request based on capabilities criteria associated with the pending or future service request and the capabilities of each of the plurality of CEs identified in the capabilities mapping table.

15 Claims, 10 Drawing Sheets

(51) Int. Cl.
  *H04L 12/26* (2006.01)
  *H04L 12/741* (2013.01)

(56) References Cited

U.S. PATENT DOCUMENTS

| | | | |
|---|---|---|---|
| 6,845,393 B1 | 1/2005 | Murphy et al. | |
| 7,990,865 B2 | 8/2011 | Chu et al. | |
| 9,300,536 B2 | 3/2016 | Agarwala et al. | |
| 9,705,747 B1* | 7/2017 | Xue | H04L 45/125 |
| 2003/0105802 A1* | 6/2003 | Kurashima | H04L 67/42 |
| | | | 709/203 |
| 2003/0144849 A1 | 7/2003 | Kakivaya et al. | |
| 2005/0010925 A1* | 1/2005 | Khawand | H04L 69/32 |
| | | | 719/310 |
| 2005/0047350 A1* | 3/2005 | Kantor | H04L 41/12 |
| | | | 370/254 |
| 2008/0313266 A1* | 12/2008 | Barrett | H04L 67/1008 |
| | | | 709/202 |
| 2010/0027517 A1* | 2/2010 | Bonta | H04L 47/824 |
| | | | 370/338 |
| 2011/0019584 A1* | 1/2011 | Raghavendran | H04L 41/12 |
| | | | 370/254 |
| 2011/0032825 A1* | 2/2011 | Minkenberg | H04L 45/66 |
| | | | 370/238 |
| 2013/0188515 A1* | 7/2013 | Pinheiro | H04L 67/16 |
| | | | 370/254 |
| 2014/0156848 A1* | 6/2014 | Uttaro | H04L 29/08171 |
| | | | 709/226 |
| 2014/0280802 A1* | 9/2014 | McDowall | H04L 41/0816 |
| | | | 709/221 |
| 2014/0280864 A1* | 9/2014 | Yin | H04L 41/12 |
| | | | 709/224 |
| 2015/0341230 A1* | 11/2015 | Dave | H04L 41/5058 |
| | | | 705/7.29 |
| 2016/0087846 A1* | 3/2016 | Prasad | H04J 14/0257 |
| | | | 398/45 |
| 2016/0119231 A1* | 4/2016 | Bournelle | H04L 45/00 |
| | | | 370/389 |
| 2017/0230451 A1* | 8/2017 | Paramasivam | G06F 16/24573 |
| 2018/0035310 A1* | 2/2018 | Castell | H04B 5/0075 |
| 2018/0102943 A1 | 4/2018 | Movsisyan | |
| 2018/0115462 A1* | 4/2018 | Makovsky | H04L 67/34 |
| 2018/0295118 A1* | 10/2018 | Otero | G06F 9/44526 |
| 2019/0095413 A1* | 3/2019 | Davis | G06F 16/907 |
| 2019/0171438 A1* | 6/2019 | Franchitti | G06F 16/9538 |
| 2019/0320040 A1* | 10/2019 | Kottapalli | H04L 67/32 |
| 2019/0342179 A1* | 11/2019 | Barnard | H04L 41/12 |
| 2019/0373056 A1* | 12/2019 | Kalach | G06F 11/1464 |
| 2019/0373084 A1* | 12/2019 | Reynolds | H04L 41/0816 |
| 2020/0097753 A1* | 3/2020 | Ash | G06K 9/2027 |

OTHER PUBLICATIONS

Shen et al., "PIRD: P2P-based Intelligent Resource Discovery in Internet-based Distributed Systems", 2008 IEEE, The 28th International Conference on Distributed Computing Systems, 2008, 8 pages.

Mell et al., "The NIST Definition of Cloud Computing", NIST, Special Publication 800-145, Sep. 2011, 7 pages.

* cited by examiner

DETERMINING CAPABILITIES OF COGNITIVE ENTITIES IN A DISTRIBUTED NETWORK BASED ON APPLICATION OF COGNITIVE PROTOCOLS

BACKGROUND

The present invention generally relates to determining capabilities of cognitive entities in a distributed network and, more particularly, to determining capabilities of cognitive entities in a distributed network based on application of cognitive protocols.

Cognitive models are aimed to remember the past, interact with individuals, continuously learn, and refine responses for future. Cognitive capabilities enrich the automation of individual needs based on time and situation and provide dynamic responses and user satisfaction. For example, some cognitive systems are made to process security processing, authentication, authorization, etc. Other cognitive systems are developed for vision recognition, document processing etc. based on a set of requirements.

SUMMARY

In an aspect of the invention, a computer-implemented method includes: detecting, by a computing device, a triggering of a discovery request event for discovering capabilities of each of a plurality of cognitive entities (CEs) in a distributed cognitive network; outputting, by the computing device, discovery requests to each of the plurality of CEs; receiving, by the computing device, respective responses to the discovery request from each of the plurality of CEs, wherein each respective response identifies capabilities of each of the plurality of CEs; generating, by the computing device, a capabilities mapping table based on the receiving the respective responses; and storing, by the computing device, the capabilities mapping table to process a pending or future service request based on capabilities criteria associated with the pending or future service request and the capabilities of each of the plurality of CEs identified in the capabilities mapping table.

In an aspect of the invention, a computer program product includes a computer readable storage medium having program instructions embodied therewith. The program instructions executable by a computing device to cause the computing device to: receive a service request from a client device to be processed by one or more cognitive entities (CEs) of a plurality of CEs in a distributed network; determine capabilities criteria associated with the service request; identify one or more target CEs of the plurality of CEs to process the service request based on the capabilities criteria and the capabilities of each of the plurality of the CEs identified in a capabilities mapping table; and output the service request towards the one or more target CEs to cause the one or more target CEs to process the service request.

In an aspect of the invention, a system includes: a processor, a computer readable memory and a computer readable storage medium associated with a computing device; program instructions to discover respective capabilities of each of a plurality of cognitive entities (CEs) in a distributed network; program instructions to generate a capabilities mapping table identifying the respective capabilities of each of the plurality of CEs; program instructions to receive a service request from a client device to be processed by one or more CEs of the plurality of CEs, wherein the service request identifies capabilities criteria; program instructions to identify one or more target CEs of the plurality of CEs to process the service request based on the capabilities criteria and the capabilities of each of the plurality of the CEs identified in a capabilities mapping table; program instructions to output the service request towards the one or more target CEs to cause the one or more target CEs to process the service request. The program instructions are stored on the computer readable storage medium for execution by the processor via the computer readable memory

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
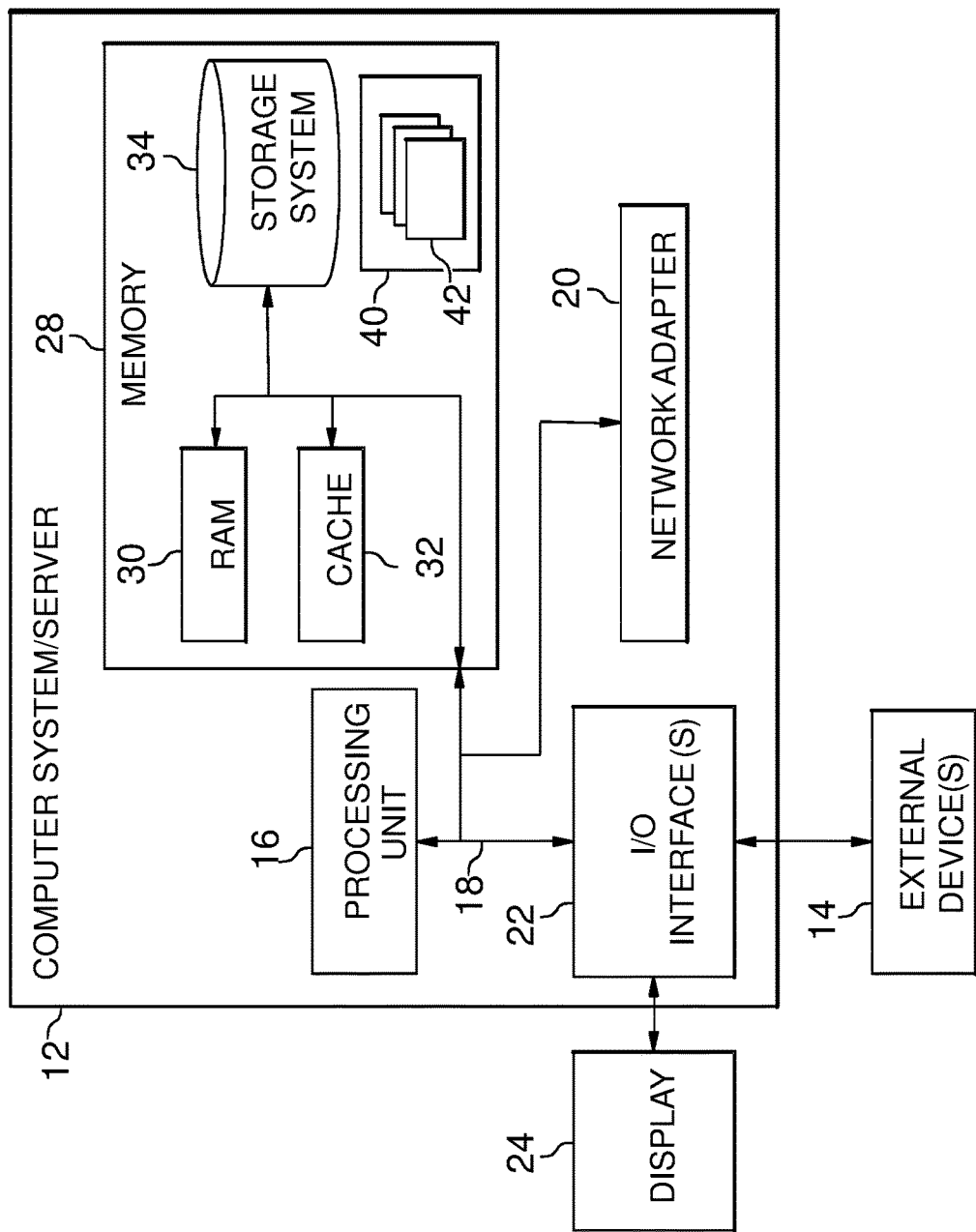
FIG. 1 depicts a cloud computing node according to an embodiment of the present invention.

The present invention generally relates to determining capabilities of cognitive entities in a distributed network and, more particularly, to determining capabilities of cognitive entities in a distributed network based on application of cognitive protocols. For collaborative system execution in accordance with aspects of the present invention, multiple cognitive entities (CEs) are connected to create a distributed cognitive system in a distributed network. As described herein, a CE includes one or more computing devices, application servers, or the like that provide a cognitive computing-based service and/or process data using one or more cognitive processes (e.g., image/audio recognition, contextual analysis, natural language classification/generation, sentiment analysis, trends analysis, data analysis services, inference analysis services, encryption/security services, or the like).

As described herein, aspects of the present invention provide a cognitive descriptive protocol which enables capability-based communication across each CE node of a distributed cognitive system. In embodiments, the cognitive protocols discover the capabilities of CE nodes through discovery requests and responses in which each CE advertises their respective capabilities. Additionally, or alternatively, cognitive processes are applied to obtain capability information through analysis and/or natural language processing of external data, such as user/critic descriptions and ratings of each CE node. Additionally, or alternatively, cognitive processes are implemented to obtain capabilities information of a CE through system evaluations in which output data is compared to an expected output, and the performance of the CE is measured based on the degree to which the output matches the expected output data.

In embodiments, aspects of the present invention add the awareness of CE node abilities and optimal cognitive path among multiple different nodes for processing a service request. In this way, an optimal path is taken between multiple CE nodes in a distributed cognitive system for processing a service request based on the parameters and requirements associated with the service request and the capabilities of each CE node.

In embodiments, information identifying the capabilities of each CE node and the path from a given CE node to other CE nodes is stored in a table, and, as CE nodes are added, removed, or modified, this table is updated (e.g., through active discovery communication between the CEs and the application of cognitive protocols). When a service request is received, information from the table is used to determine the best suited CE (or CEs) to process the service request based on the parameters of the service request, the capabilities of the CEs, and the optimal paths to reach those CEs. As an illustrative, non-limiting example, if the service request includes a request for audio/visual processing of certain payload data, and for the output of the data to be secured, aspects of the present invention identify which CEs in a distributed network have the best capabilities to provide the audio/visual processing and security services, and which CEs are on the most optimal (or shortest) path for receiving and processing the service request.

In embodiments, aspects of the present invention, in contrast with other systems, collect information from peer CEs about the capabilities of each CE. Further, aspects of the present invention process the capability information for optimal service request assignment and processing. Also, in contrast with other system, aspects of the present invention exchange capabilities information across a distributed cognitive system's nodes and accordingly, the loads from service requests are shared across multiple CE nodes, thereby saving the computing resources for use towards future infrastructure.

Other techniques to connect to distributed CE's based on existing communication protocols lack the ability for cognition enabled devices (e.g., CE's) to communicate information regarding their features. Accordingly, aspects of the present invention provide a technique for CE's in a distributed cognitive network to communicate information regarding their features and capabilities. In this way, the best suited CE or CEs are utilized for processing a service request, and an optimal path is taken for communicating with those CEs. For example, in a distributed cognitive network in accordance with aspects of the present invention, a CE that has a relatively high capability and efficiency (e.g., when measured against performance metric) for processing a particular type of service request for a client device (e.g., audio-visual processing service request) will process the service request instead of a different CE, which may have the capability to process the service request, but that resides in a non-optimal path from the client device. In other words, aspects of the present invention provide a technique by which capabilities and communications path data can be determined, collected, and stored to optimize feature-based routing of service requests across distributed cognitive systems.

In embodiments, aspects of the present invention include a centralized CE management device which co-exists within a distributed cognitive computing network, and facilitates the CEs to "handshake" with each other to communicate their respective capabilities. Aspects of the present invention implement a cognitive descriptive protocol that processes the mechanism of CE and capability discovery, information collection, and distribution across the CE's in the distributed cognitive computing network. In one or more alternative embodiments, a centralized CE management device is not used and each of the CE nodes individually implements the cognitive descriptive protocol for capability discovery and dissemination across the distributed cognitive computing network.

As described herein, in multi-node distributed CE networks, multiple CE nodes are proficient of processing certain types of service requests. In accordance with aspects of the present invention, when a service demand or service request originates from an upper layer of the network, the receiving CE (or the centralized CE management device) determines a candidate CE (or CE's) in the network to process the service request. To determine the processing candidate(s), aspects of the present invention implements a cognitive descriptive protocol which discovers the capabilities (e.g., a multi-level domain set) from each CE node using a specified format. Once the capabilities are discovered, the information is shared across the CEs in the networked system. Upon reception of the capability information from peer CEs, the receiving CE updates the existing capability records and also updates optimal routing path information for routing and forwarding the service request to the candidate CE(s). In embodiments, the candidate CEs are scored and the highest scored CE (or highest scored combination of CEs) is selected for processing the service request. In embodiments, the score is weighted and is based on the degree to which the service request matches the capability of the candidate CE, the network path (e.g., shorter paths are scored relatively higher), and/or other configurable and weighted criteria (e.g., a criterion to prioritize CEs with higher network and computing process performance over cost, or vice versa).

In embodiments, aspects of the present invention provide enhanced security of a distributed CE network. For example, in the event that one of the interconnected CE implements enhanced security protocols and has connection to an advanced secure communication channels, then using the process of aspects of the present invention, the confidential and vital data processing is routed to such CE nodes which improves overall security of data.

Aspects of the present invention provide multi-level capability discovery which also improves load balancing across the distributed network. For example, in embodiments, service requests are forwarded to the next CE candidate (e.g., with the next highest score) in the event that the highest scored candidate CE nodes are overloaded with servicing other tasks/requests. In such a situation, the next CE candidate is selected based on its score, which in some embodiments, is based on shortest path.

In embodiments, once a CE node is added, removed, or modified, discovery processes are executed to update capability and path tables on each CE to reflect the newly added, removed, or modified CE. As an illustrative example of aspects of the present invention nodes, each CE node in a distributed cognitive system stores, updates, and maintains a table identifying the capabilities of each CE node, an identifier of each CE node, a type or performance capability description of each capability, and an optimal path between each CE node. An example table is provided below:

TABLE 1

CE Capability and Path Table

| Capability | Unique_Node_name | Type | Optimal Cognitive path |
|---|---|---|---|
| Enhanced data privacy | CE_0001 | Primary | CE_0001 |
| Enhanced data processing security | CE_0002 | Secondary | CE_0002 |
| Audio-visual Processing | CE_0003 | Tertiary | CE_0002 -> CE_0004 -> CE_0003 |
| Secured communication channel | CE_0001 | Secondary | CE_0001 |
| Vision recognition | CE_0003 | Primary | CE_0002 -> CE_0004 -> CE_0003 |
| Vision recognition | CE_0004 | Secondary | CE_0002 -> CE_0004 |
| Document processing expert | CE_0001 | Primary | CE_0001 |
| Enhanced data storage capability | CE_0004 | Secondary | CE_0002 -> CE_0004 |
| . . . | . . . | . . . | . . . |

As described herein, aspects of the present invention provide a solution to the problem of optimal service request processing through the use of rules and criteria. In embodiments, aspects of the present invention generate new information (e.g., information regarding the capabilities and optimal paths to CE nodes) and use that new information to more efficiently process service requests by the best suited CE(s). Further, aspects of the present invention improve the performance computing systems by reducing network congestion by forwarding service requests via optimal paths, and processing service requests as efficiently as possible with the best suited CEs (e.g., CEs whose capabilities most closely match the parameters of the service request).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
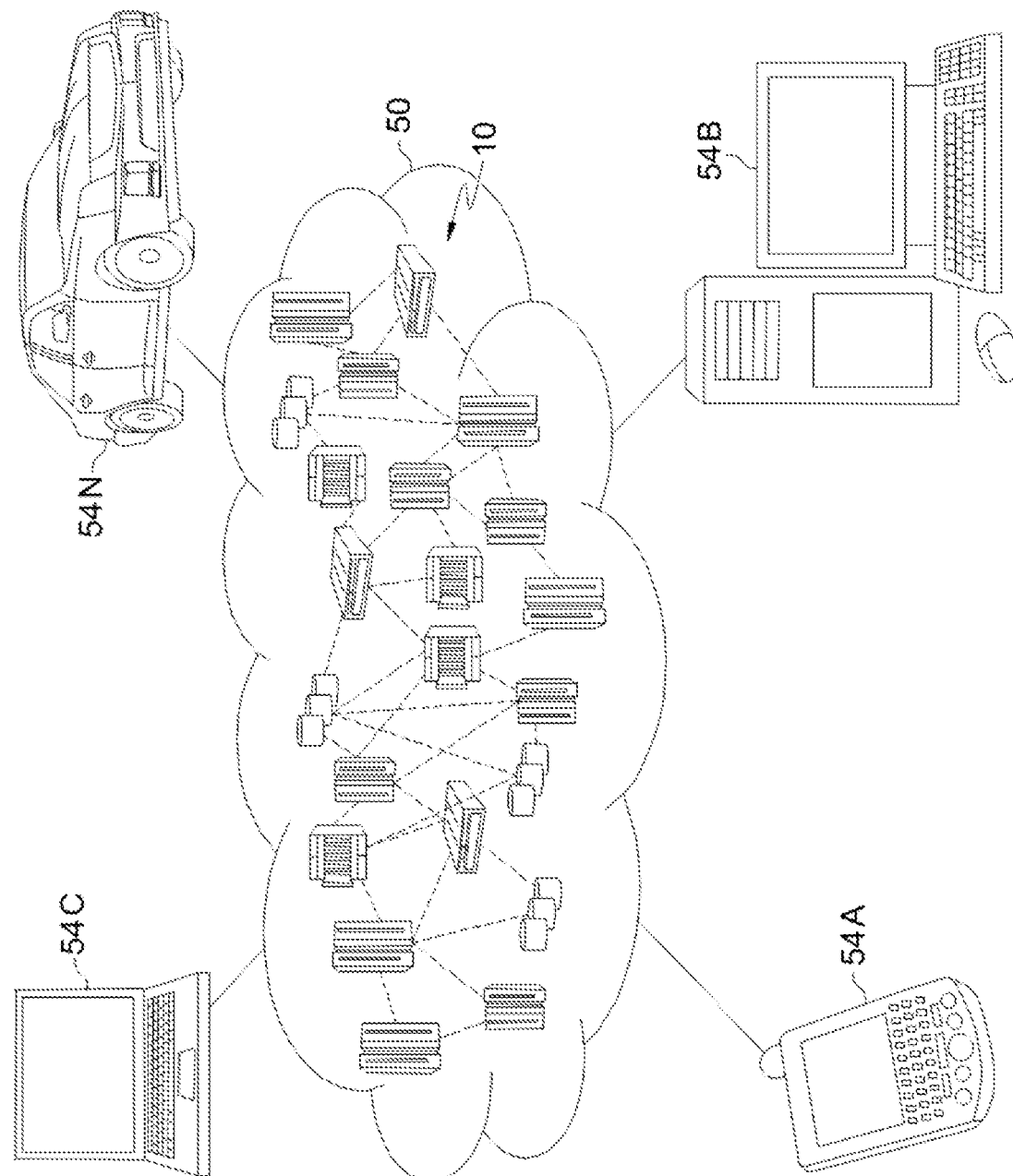
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
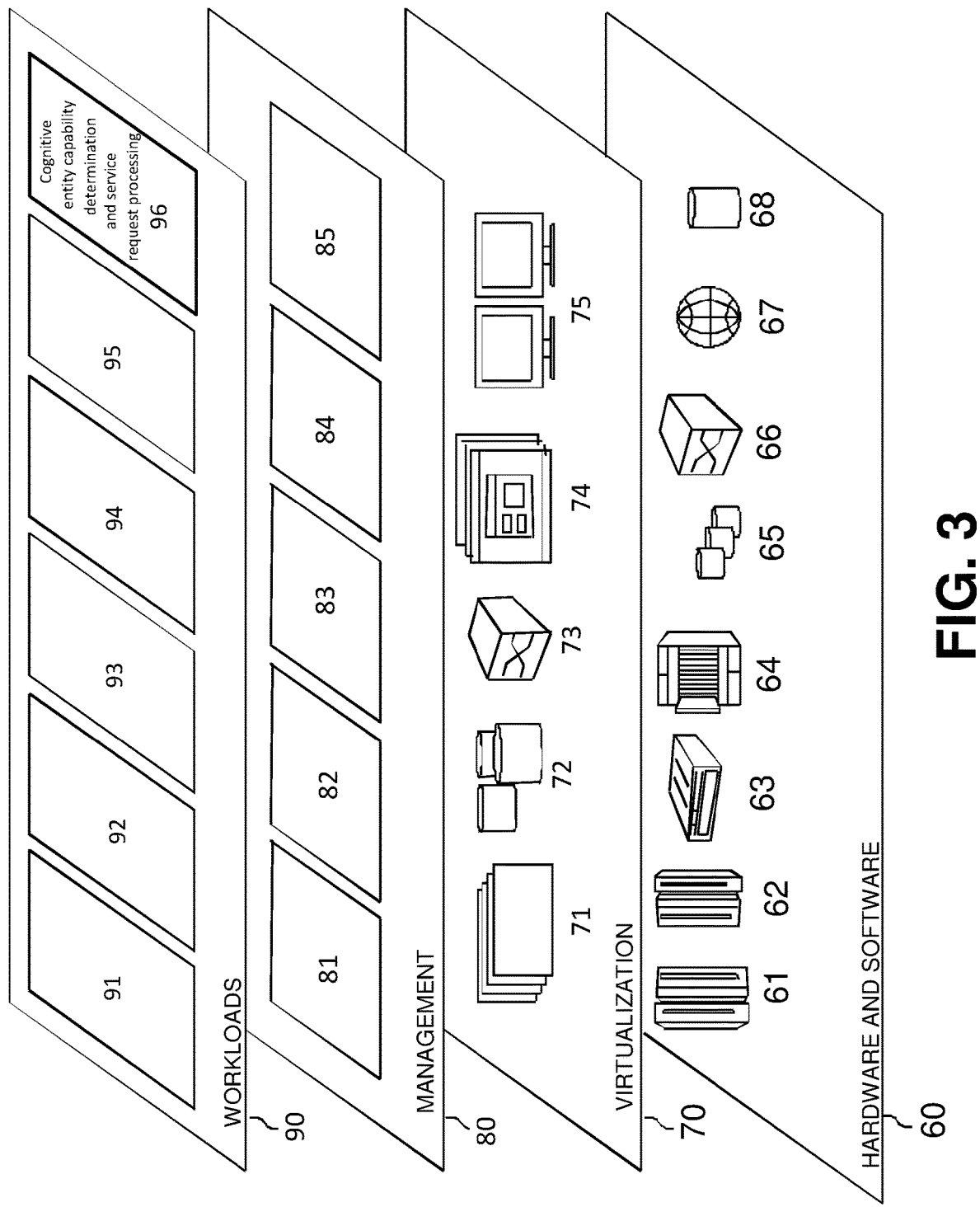
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive entity capability determination and service request processing 96.

Referring back to FIG. 1, the program/utility 40 may include one or more program modules 42 that generally carry out the functions and/or methodologies of embodiments of the invention as described herein (e.g., such as the functionality provided by cognitive entity capability determination and service request processing 96). Specifically, the program modules 42 may execute a discovery process (e.g., including cognitive discovery processes) for discovering the capabilities of cognitive entities in a distributed network; update local tables storing information regarding capabilities and path maps, use the information from the tables to determine candidate CEs to process a service request, and output the service request towards the candidate CEs for processing the service request. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a CE and/or a CE management device as shown in FIG. 4.

Figure 4:
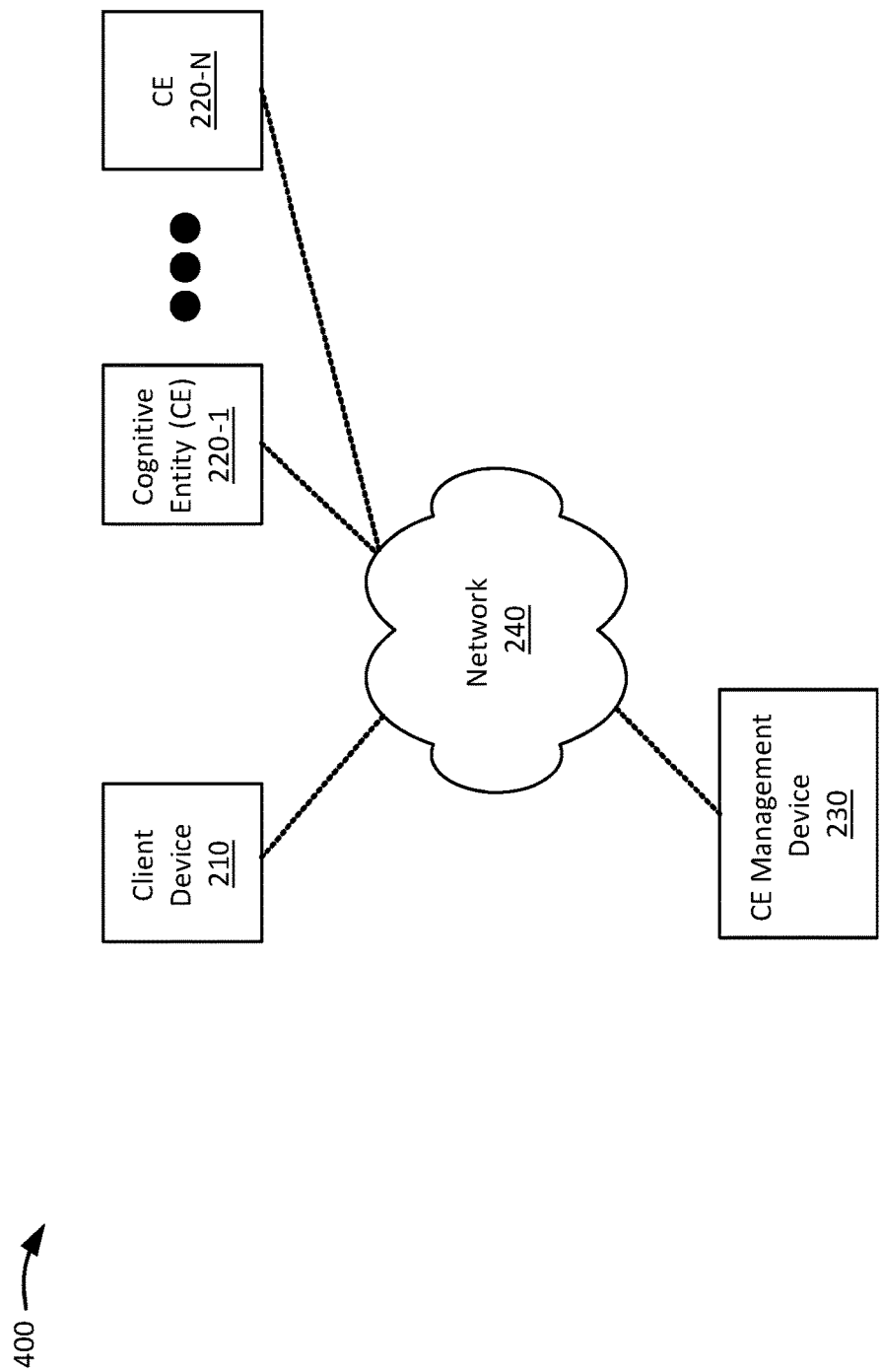
FIG. 4 shows an example overview and environment in accordance with aspects of the present invention.

FIG. 4 shows an example overview and environment in accordance with aspects of the present invention. As shown in FIG. 4, environment 400 includes a client device 210, cognitive entities (CE 220-1 through CE 220-N, where N is >1), a CE management device 230, and a network 240. As described herein, a single one of CE 220-1 through CE 220-N is alternatively referred to as a "CE 220," and multiple ones of CE 220-1 through CE 220-N are alternatively referred to as "CEs 220." In embodiments, one or more components in environment 400 may correspond to one or more components in the cloud computing environment of FIG. 2. In embodiments, one or more components in environment 400 may include the components of computer system/server 12 of FIG. 1.

The client device 210 includes a computing device capable of communicating via a network, such as the network 240. In example embodiments, the client device 210 corresponds to a mobile communication device (e.g., a smart phone or a personal digital assistant (PDA)), a portable computer device (e.g., a laptop or a tablet computer), a desktop computer, an application server, and/or another type of computing device. In some embodiments, the client device 210 is used to request a service to be processed by the one or more CEs 220 (e.g., in connection with the execution of an application). As an illustrative example, the client device 210 requests an audio/visual recognition service as part of a contextual analysis application used to draw conclusions or interfaces based on an audio/visual analysis of an environment or facility. As another example, client device 210 requests sentiment analysis as part of an application that uses sentiment analysis data for any variety of purposes.

The CEs 220-1 through 220-N each include one or more computing devices (e.g., such as computer system/server 12 of FIG. 1) that provide a cognitive computing-based service and/or process data using one or more cognitive processes. For example, in embodiments, the CEs 220-1 through 220-N each perform image/audio recognition, contextual analysis, natural language classification/generation, sentiment analysis, trends analysis, data analysis services, inference analysis services, encryption/security services, or the like.

The CE management device 230 includes one or more computing devices (e.g., such as computer system/server 12 of FIG. 1) that execute a discovery process (e.g., including cognitive discovery processes) for discovering the capabilities of CEs 220. Further, the CE management device 230 updates local tables storing information regarding capabilities and path maps, uses the information from the tables to determine candidate CEs 220 to process a service request, and outputs the service request towards the candidate CEs 220 for processing the service request.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (4G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. In an example embodiment, the CE management device 230 is implemented as a separate, stand-alone centralized server or cluster of servers. In alternative embodiments, each CE 220 individually implements and executes the functions of the CE management device 230. Devices of the environment 400 may interconnect via wired connections, wireless connections, or a combination of wired and wireless connections.

Figure 5:
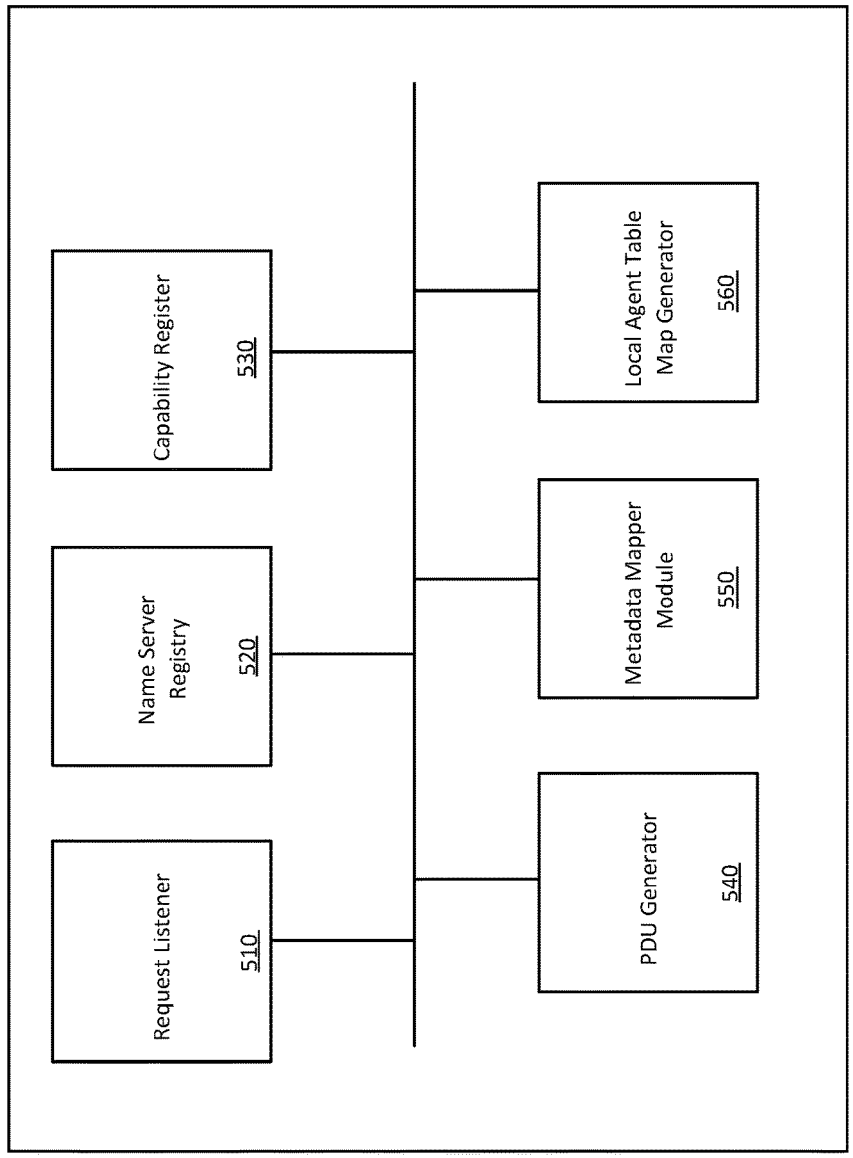
FIG. 5 shows a block diagram of example components of a CE and/or a CE management device in accordance with aspects of the present invention.

FIG. 5 shows a block diagram of example components of a CE and/or a CE management device in accordance with aspects of the present invention. As shown in FIG. 5, the CE 220 and/or the CE management device 230 includes a request listener 510, a name server registry 520, a capability register 530, a protocol data unit (PDU) generator 540, a metadata mapper module 550, and a local agent table map generator 560. In embodiments, the CE 220 and/or the CE management device 230 may include additional or fewer components than those shown in FIG. 5. In embodiments, separate components may be integrated into a single computing component or module. Additionally, or alternatively, a single component may be implemented as multiple computing components or modules.

In embodiments, the request listener 510 includes a program module (e.g., program module 42 of FIG. 1) that monitors service requests provided by the client device 210. In embodiments, the request listener 510 detects the transmission of a service request by the client device 210 which triggers a discovery event which, in turn, causes the CE 220 and/or CE management device 230 to execute a discovery process as described in greater detail herein. In embodiments, the request listener 510 logs service request activity, which as described herein, is used to build a repository of performance metrics with respect to the performance of the service request processing. Additionally, or alternatively, the service requests are monitored to cognitively anticipate when a service request is expected to be received from a particular client device 210 so that a corresponding CE 220 is prepared to process the service request (e.g., when service requests are provided on a scheduled or recurring basis).

In embodiments, the name server registry 520 includes a data storage device (e.g., storage system 34 of FIG. 1) that stores identification information for each CE 220 in a distributed network. In embodiments, the name server registry 520 includes a domain name server (DNS) registry, or the like.

In embodiments, the capability register 530 includes a data storage device (e.g., storage system 34 of FIG. 1) that stores information about the capabilities of a CE 220. In embodiments, the capabilities information is provided by an administrator of the CE. Additionally, or alternatively, the capabilities information is determined based on a cognitive system evaluation process. For example, the cognitive system evaluation includes providing an input service request to the CE 220, analyzing the output of the input service request once processed by the CE, and determining the degree to which the output provided by the CE 220 matches an expected output. Additionally, or alternatively, the capabilities information is determined based on cognitive analysis (e.g., natural language processing) of external sources, such as user/critic ratings of the CE, performance testing results, etc.

In embodiments, the PDU generator 540 includes a program module (e.g., program module 42 of FIG. 1) that generates capability discovery requests in the form of PDUs. As described herein, the PDUs are transmitted to each CE 220 to request information regarding the capabilities of each CE 220 (e.g., as stored by the capability register 530 associated with each CE). In embodiments, the PDU generator 540 decodes responses to PDUs to identify respective capabilities of each CE 220.

In embodiments, the metadata mapper module 550 includes a program module (e.g., program module 42 of FIG. 1) that maps metadata received from responses to capability discovery requests PDUs to a global capability map. For example, the metadata identifies information from which the capability of a CE 220 can be inferred using cognitive processes (e.g., metadata relating to the hardware/software configuration of the CE 220, service request processing logs of the CE 220, etc.). In embodiments, the metadata mapper module 550 in infers the metadata (e.g., using one or more cognitive processes), and maps the metadata to the corresponding CE.

In embodiments, the local agent table map generator 560 includes a program module (e.g., program module 42 of FIG. 1) that generates a table or map (or updates an existing local agent table map) in which each entry identifies a CE 220 in a distributed network (e.g., based on its server identification stored by the name server registry 520), the capabilities of each CE 220 (e.g., as stored by the capability register 530 of each CE, obtained by the PDU generator 540, and mapped by the metadata mapper module 550), and optimal paths from one CE 220 to another CE 220. In embodiments, the optimal path is determined using any suitable path determination technique. An example of the local agent table map is shown in Table 1.

In embodiments, (e.g., when a CE management device 230 is not used as a stand-alone entity and when each CE 220 implements the functions of the CE management device 230), each CE 220 stores its own version of a local agent table map. In this embodiment, the optimal path identifies a path from a given CE 220 to other CEs 220 in the distributed network. In other embodiments (e.g., when a CE management device 230 is used as a centralized stand-alone entity), the local agent table map includes a separate column for each optimal path from one CE 220 to another CE 220. For example, the local agent table map includes one column identifying a path starting at CE 220-1 and ending at CE 220-2, CE 220-3, etc. The local agent table map includes another column identifying a path starting at CE 220-2, and ending at CE 220-3, CE 220-1, etc.

Figure 6A:
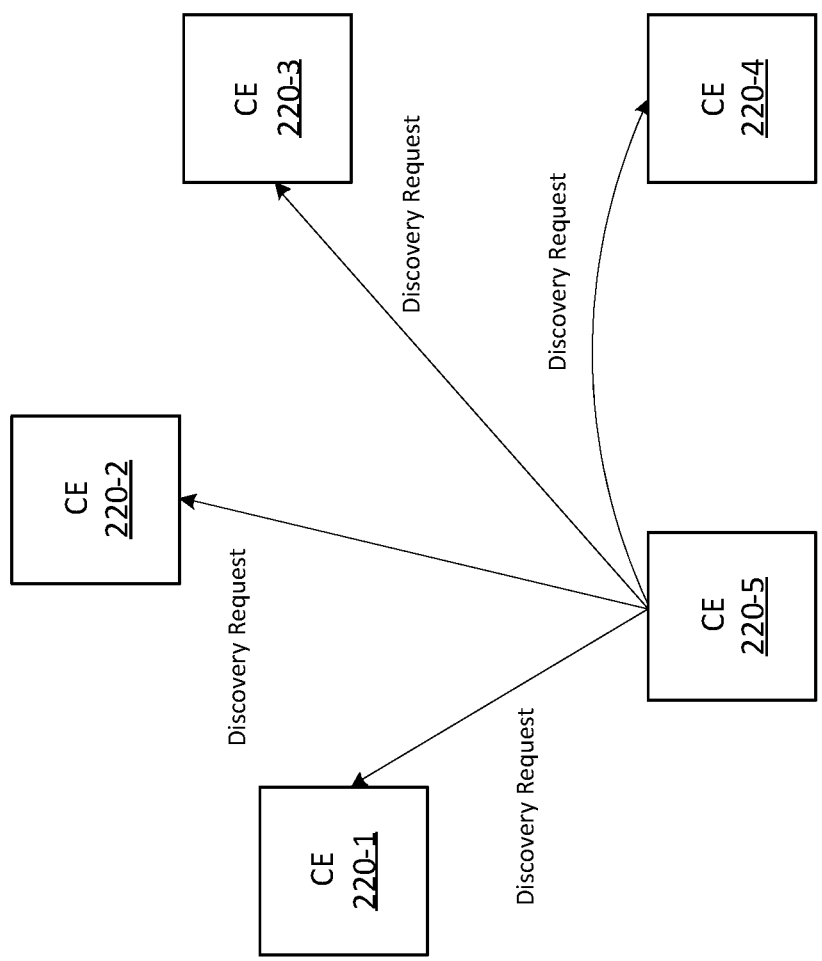
FIGS. 6A-6C show example implementations in accordance with aspects of the present invention.
Figure 6B:
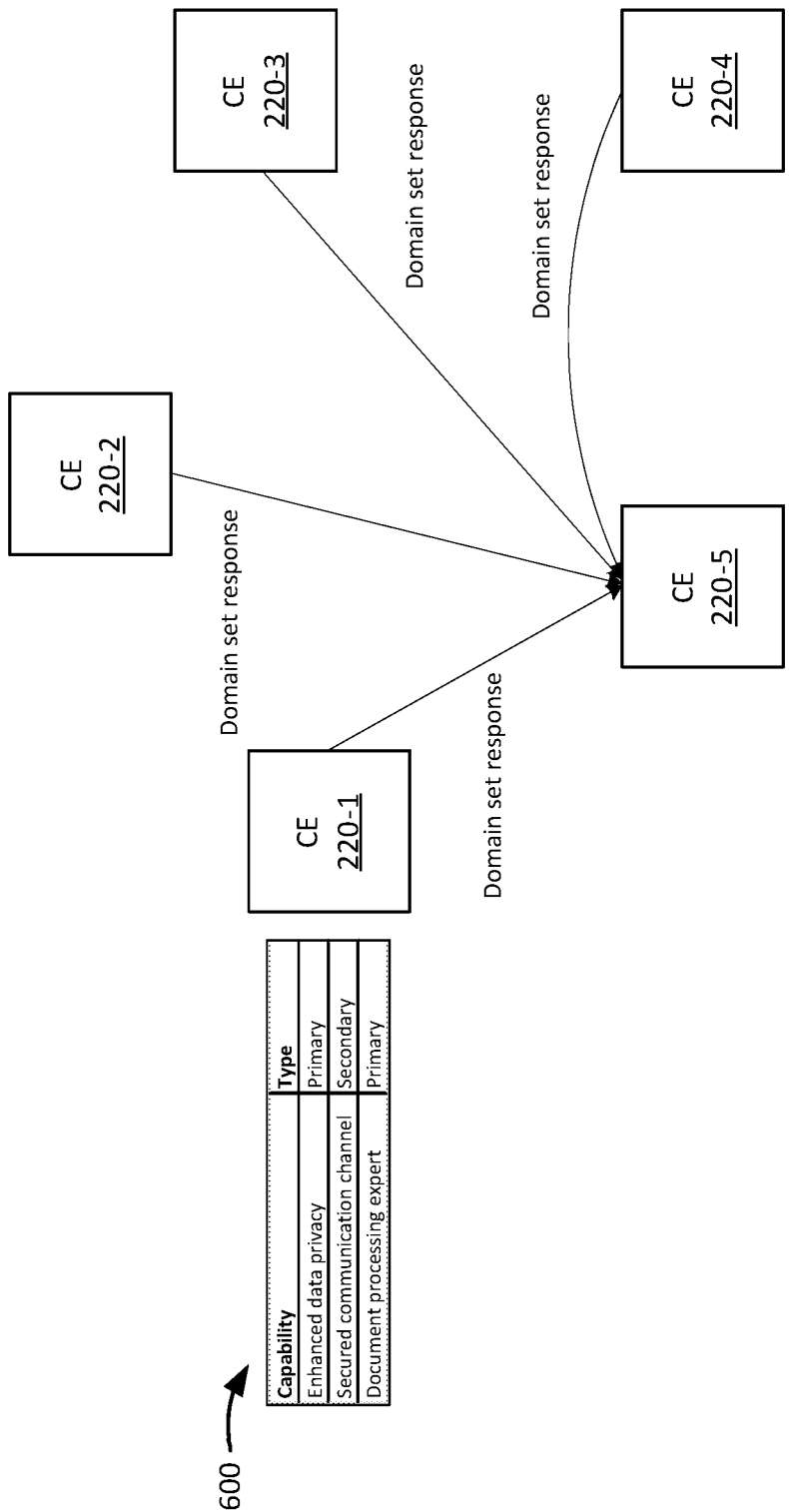
Figure 6C:
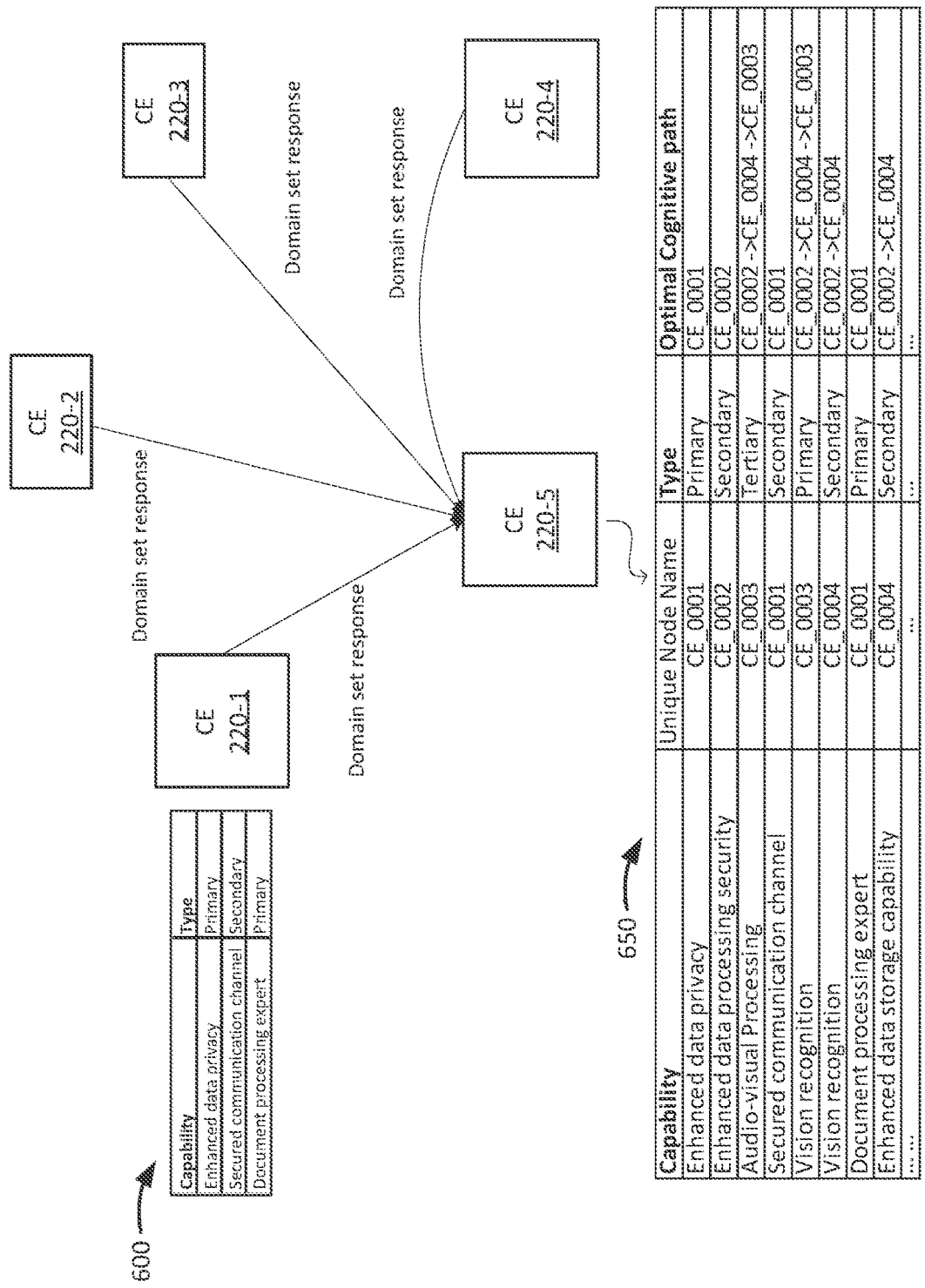

FIGS. 6A-6C show example implementations as described herein. The example shown in FIGS. 6A-6C illustrate an example embodiment in which each CE 220 individually implements the functions of the CE management device 230. Referring to FIG. 6A, upon the occurrence of a discovery event by a CE 220 (e.g., by CE 220-5), the CE 220-5 broadcasts an initialization signal and a discovery request to all known CEs 220 (e.g., in the form of PDUs as generated by the PDU generator 540). As described herein, the discovery event includes the receipt of a service request, instantiation of a new CE 220, a change to an existing CE 220, and/or a time in which a periodic or recurring discovery process is due.

Referring to FIG. 6B, upon reception of the initialization signal, each CE 220 awaits the discovery request. Once the discovery request is received, each CE 220 outputs a domain set response to the originating CE 220 (e.g., CE 220-5). As described herein, the domain set response identifies all the hierarchical capability lists as part of payload PDU. An example of the domain set response 600 for CE 220-1 is shown in FIG. 6B. As shown, the domain set response 600 identifies the capabilities of the CE 220-1 and the type of capability (e.g., primary, secondary, etc.). In embodiments, the type of capability is determined based on a performance standard or proficiency level (e.g., a capability is considered to be "primary" when the performance of the CE 220 for that capability satisfies a threshold proficiency level). As described herein, each CE 220 may include multiple primary capabilities.

Referring to FIG. 6C, once the domain set response is received by the originating CE 220-5, the multilevel capabilities are extracted from each response and local tables stored by the CE 220-5 are updated with updated CE and capability maps as shown in a local agent capabilities mapping table 650. In embodiments, the local agent capabilities mapping table 650 is used to fetch for the routing information based on the parameters of a service request, and the service request is forwarded to the respective CEs 220 for processing. As described herein, information from the local agent capabilities mapping table 650 is used to score candidate CEs 220 based on the paths, capabilities of the CEs 220, and type of service request. Also, information from the local agent capabilities mapping table 650 can be obtained not only by responses to discovery requests, but by applications of other cognitive processes to discover the capabilities of each CE 220 (e.g., cognitive system evaluation, natural language processing of external data, etc.).

Figure 7:
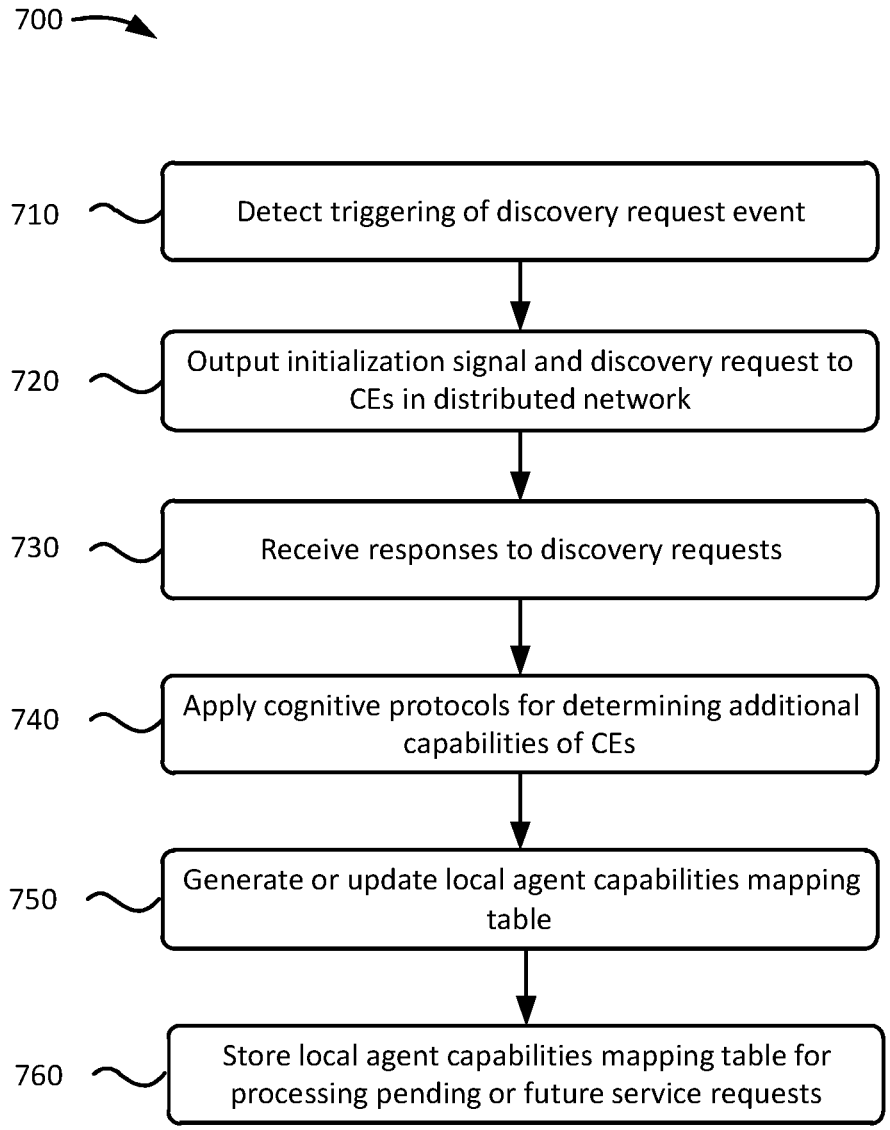
FIG. 7 shows an example flowchart of a process for generating and maintaining a local agent capabilities mapping table in accordance with aspects of the present invention.

FIG. 7 shows an example flowchart of a process for generating and maintaining a local agent capabilities mapping table. The steps of FIG. 7 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 7, process 700 includes detecting the triggering of a discovery request event (step 710). For example, the CE management device 230 detects the triggering of a discovery request event, such as when the request listener 510 detects a service request sent by the client device 210. Additionally, or alternatively, discovery request event is triggered based on the instantiation of a new CE 220 (e.g., as detected by monitoring of blogs, message boards, etc., or broadcasted by the new CE 220). Additionally, or alternatively, the discovery request event is triggered on a periodic cycle for periodic refreshing of CE capability and map information.

Process 700 also includes outputting an initialization signal and discovery request to CEs in the distributed network (step 720). For example, as described above with respect to the PDU generator 540, the CE management device 230 outputs initialization signals and also discovery requests (e.g., in the form of PDUs). As described herein, the PDUs are transmitted to each CE 220 to request information regarding the capabilities of each CE 220 (e.g., as stored by the capability register 530 associated with each CE).

Process 700 further includes receiving responses to the discovery requests (step 730). For example, as described above with respect to the PDU generator 540, the CE management device 230 receives and decodes responses to the discovery request received from each CE 220 to which the discovery requests were sent. As described herein, the responses identify one or more capabilities, types, and proficiency levels (e.g., primary, secondary, etc.) of each CE 220. Additionally, or alternatively, the responses identify metadata from which the capabilities can be inferred (e.g., metadata relating to the hardware/software configuration of the CE 220, service request processing logs of the CE 220, etc.).

Process 700 also includes applying cognitive protocols for determining additional capabilities of the CEs (step 740). For example, as described above with respect to the metadata mapper module 550, the CE management device 230 applies cognitive processing to metadata included in the discovery responses (e.g., received at step 730) to determine additional capabilities that may not have been directly identified in the discovery responses. Additionally, or alternatively, the CE management device 230 applies cognitive processing (e.g., natural language classification, etc.) to external data sources, such as message boards, blogs, etc., to determine additional capabilities of the CEs 220.

Process 700 further includes generating or updating a local agent capabilities mapping table (step 750). For example, as described above with respect to the local agent table map generator 560, the CE management device 230 generates a table or map (or updates an existing local agent table map) in which each entry identifies a CE 220 in a distributed network (e.g., based on its server identification stored by the name server registry 520), the capabilities of each CE 220 (e.g., as stored by the capability register 530 of each CE, obtained by the PDU generator 540, and mapped by the metadata mapper module 550), and optimal paths from one CE 220 to another CE 220. In embodiments, the optimal path is determined using any suitable path determination technique.

Process 700 also includes storing the local agent capabilities mapping table for processing a pending or future service requests (step 760). For example, the CE management device 230 stores the local agent capabilities mapping table (e.g., generated or updated at step 750). In embodiments where the discovery request event at step 710 includes the detection or receipt of a service request sent by the client device 210, the CE management device 230 processes this pending service request using the stored local agent capabilities mapping table. Additionally, or alternatively, the CE management device 230 processes a future service request using the stored local agent capabilities mapping table. The processing of the pending service request or of a future service request is described in greater detail with respect to FIG. 8. In embodiments, process 700 is described as being performed by the CE management device 230, however, in practice and in one or more embodiments, process 700 is performed by the CE 220.

Figure 8:
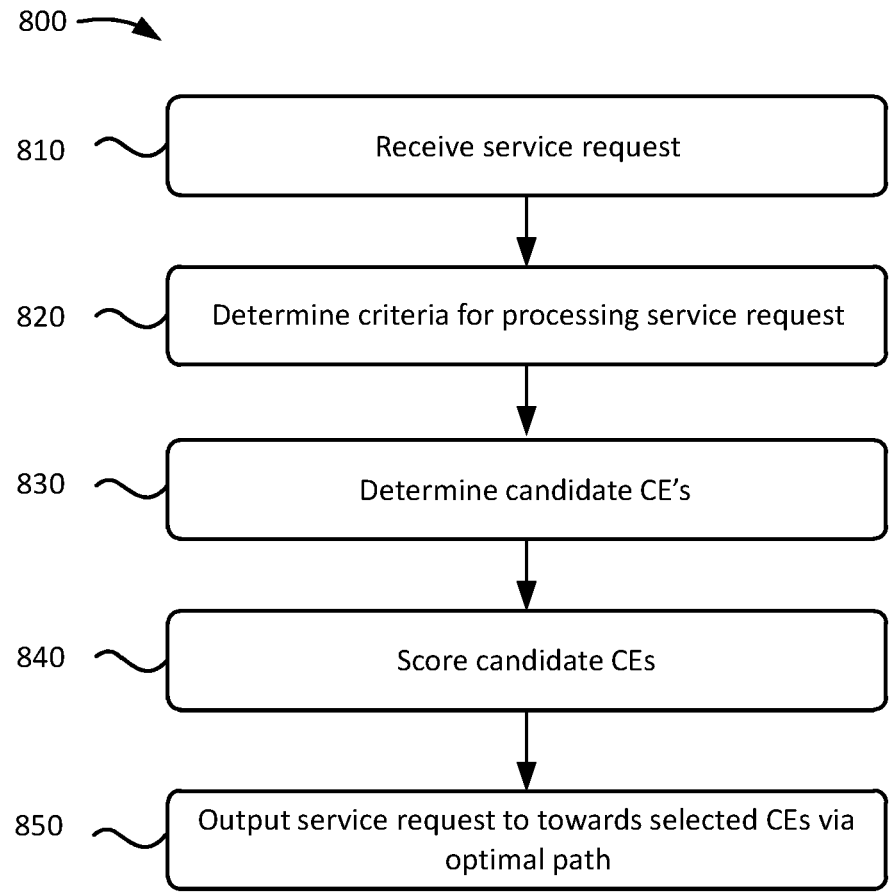
FIG. 8 shows an example flowchart of a process for processing a service request based on capabilities of CEs and optimal paths in accordance with aspects of the present invention.

FIG. 8 shows an example flowchart of a process for processing a service request based on capabilities of CEs and optimal paths. The steps of FIG. 8 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 8, process 800 includes receiving a service request (step 810). For example, the CE management device 230 receives a service request from the client device 210. In embodiments, the CE management device 230 receives any variety of service requests in connection with an application (e.g., audio/visual recognition service as part of a contextual analysis application used to draw conclusions or interfaces based on an audio/visual analysis of an environment or facility, sentiment analysis, etc.).

Process 800 also includes determining criteria for processing the service request (step 820). For example, the CE management device 230 determines criteria, such as the parameters of the service request (e.g., the types of services requested, the capabilities needed to process the service request, etc.). Additionally, or alternatively, the CE management device 230 determines other criteria which can be included in the request or inferred based on identification information of an account or user associated with the client device 210. As an illustrative example, the CE management device 230 determines criteria relating to performance standards, processing cycle times, network Quality of Service (QoS) levels, security requirements, etc.

Process 800 further includes determining candidate CEs (step 830). For example, the CE management device 230 accesses its local agent capabilities mapping table (e.g., generated by the local agent table map generator 560 and using process 700) to determine candidate CEs 220 having the capabilities to fulfill the service request criteria (e.g., as determined at step 820). As an illustrative example, the CE management device 230 accesses its local agent capabilities mapping table to identify candidate CEs 220 that meet criteria for capabilities, security requirements, etc.

Process 800 also includes scoring the candidate CEs (step 840). For example, the CE management device 230 scores the candidate CEs based on weights in which the scores are based on the degree to which the service request matches the capability of the candidate CE, the network path (e.g., shorter paths are scored relatively higher), and/or other configurable and weighted criteria (e.g., a criteria to prioritize CEs with higher network and computing process performance over cost, or vice versa). In embodiments, the CE management device 230 implements any suitable scoring technique using the capabilities and paths from the local agent capabilities mapping table as well as the service request criteria (e.g., determined at step 820) as inputs into a scoring algorithm. In embodiments, the scores are on a numeric scale (e.g., from zero to 100) in which higher scores are considered more favorable candidates. In embodiments, the CE management device 230 automatically scores CEs 220 that do not meet certain criteria (e.g., security requirements) to zero such that those CEs 220 are not selected to process service requests.

Process 800 further includes outputting the service request towards selected CEs via an optimal path (step 850). For example, the CE management device 230 outputs the service request towards selected (or target) CEs 220 (e.g., the CEs 220 having the highest scores and having the network/processing capacity to process the service request). Further, the CE management device 230 outputs the service request via the optimal path stored in the local agent capabilities mapping table. In embodiments, the receiving CEs 220 process the service request and provide the processed data to the requesting client device 210 (e.g., directly or via the CE management device 230). In embodiments, (e.g., in a situation in which a CE 220 is overloaded and is unable to process the service request), the CE management device 230 output the service request to an alternate CE 220 (e.g., the next highest scored CE 220 that has the capacity to process the service request). In embodiments, process 800 is described as being performed by the CE management device 230, however, in practice and in one or more embodiments, process 800 is performed by the CE 220.

Aspects of the present invention collect the capability of individual CEs 220 and discover, collect and operate such capabilities in a distributed cognitive system. Aspects of the present invention provide the ability to collect fitness-based information (e.g., capability performance and type information) from all multiple CEs 220 in the distributed cognitive system and update local capability information in each CE 220. Further, aspects of the present invention provide multi-level domain set (e.g., the list of functions that each CE 220 is capable of executing) as part of a response frame for the collection and capability metadata exchange across the network when demanded. Aspects of the present invention provide capability maps to each CE 220 which are later used to compute paths to services for processing service requests. In embodiments, multiple paths are determined and the optimal cognitive path is tagged as a primary path.

In embodiments, aspects of the present invention generate discovery requests in the form of PDUs and decode response PDUs (e.g., responses to the discovery requests). Aspects of the present invention provide the ability to map the response information collected to a local or global capability mapper metadata. Aspects of the present invention provide the ability to update a capability based optimal cognitive path to either local or centralized locations. In embodiments, periodic and interrupt driven updates of local and global capability maps are implemented in order to discover new functions, features, and/or CEs. In embodiments, aspects of the present invention provide the ability to gather security information and security level of cognitive entities and forward the processing requests based on the security compliance to appropriate CEs 220. In embodiments, aspects of the present invention provide the ability to select processing target CEs 220 based on the abilities discovered. If a selected CE 220 is detected to be "busy" overloaded, then aspects of the present invention use multi-level hierarchical information to update the target processing location (e.g., the next highest scored CE 220 that has the capacity to fulfill the service request). In embodiments, this information is collected as part of a discovery response of the HELLO message.

In embodiments, aspects of the present invention provide the ability to operate in centralized mode (e.g., when the CE management device 230 is implemented as a stand-alone entity separate from the CEs 220). In embodiments, the CE management device 230 contains a server-based registry map and classifier which is updated by individual CEs 220 based on detected changes. Also, when operating in centralized mode, aspects of the present invention store the optimal cognitive path as local information to all the CEs 220 and paths are updated dynamically on a request-response basis. In embodiments, aspects of the present invention provide the ability to locate the optimal path to target CEs 220 and services and utilize this data during invocation of service requests from upper layers.

In embodiments, aspects of the present invention, responsive to receiving a service request, perform a cognitive descriptive protocol that discoverers capabilities of each CE 220 in a multi-node networked system. Further, aspects of the present invention shares capabilities of each discovered CE 220 in the multi-node system to each CE 220 connected to the multi-node networked system, and determines an optimal path having one or more CEs 220 in the multi-node networked system to process the service request. In embodiments, the service request is processed using the determined optimal path. In embodiments, aspects of the present invention add a new node into the multi-node network system; and responsive to adding the new node, shares the capabilities of the new node to each device connected to the multi-node network system.

In embodiments, aspects of the present invention determine an optimal path by determining security measures required for the service request; and responsive to determining the security measures required for the service request, including only CEs 220 of the multi-networked system that comply with the security measures specified for the service request. In embodiments, aspects of the present invention, responsive to receiving an error in processing the service request, recommending an alternate CE 220 for an alternated optimal path calculation.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by a computing device, a triggering of a discovery request event for discovering capabilities of each of a plurality of cognitive entities (CEs) in a distributed cognitive network;
   outputting, by the computing device, discovery requests to each of the plurality of CEs;
   receiving, by the computing device, respective responses to the discovery request from each of the plurality of CEs, wherein each respective response identifies capabilities of each of the plurality of CEs;
   determining, by the computing device, additional capabilities of the plurality of CEs based on applying cognitive protocols to metadata included in the respective responses;
   generating, by the computing device, a capabilities mapping table based on the receiving the respective responses; and
   storing, by the computing device, the capabilities mapping table to process a pending or future service request based on capabilities criteria associated with the pending or future service request and the capabilities of each of the plurality of CEs identified in the capabilities mapping table.

2. The computer-implemented method of claim 1, further comprising:
   determining optimal paths for communicating with each of the plurality of CEs; and
   storing information identifying the optimal paths in the capabilities mapping table for processing the pending or future service request.

3. The computer-implemented method of claim 1, wherein the computing device is a stand-alone and centralized device separate from each of the plurality of CEs.

4. The computer-implemented method of claim 1, further comprising providing an initialization signal to each of the plurality of CEs prior to providing the discovery request.

5. The computer-implemented method of claim 1, wherein the discovery request is provided as a protocol data unit (PDU).

6. The computer-implemented method of claim 1, wherein the capabilities criteria comprises security criteria.

7. The computer-implemented method of claim 6, wherein the pending or future service request is processed only by a CE meeting the security criteria.

8. The computer-implemented method of claim 1, wherein the discovery request event includes at least one selected from the group consisting of:
   receiving the pending service request;
   the instantiation of a new CE;
   a change to an existing CE of the plurality of CEs; and
   a time in which a periodic or recurring discovery process is due.

9. The computer-implemented method of claim 1, wherein a service provider performs at least one selected from the group consisting of: creates the computing device, maintains the computing device, deploys the computing device, and supports the computing device.

10. The computer-implemented method of claim 1, wherein the detecting the triggering of the discovery request event, the outputting the discovery requests, the receiving the respective responses, the generating the capabilities mapping table, and the storing the capabilities mapping table are provided by a service provider on a subscription, advertising, and/or fee basis.

11. The computer-implemented method of claim 1, wherein the computing device includes software provided as a service in a cloud environment.

12. The computer-implemented method of claim 1, further comprising deploying a system, wherein the deploying the system comprises providing a computer infrastructure operable to perform the triggering of the discovery request event, the outputting the discovery requests, the receiving the respective responses, the generating the capabilities mapping table, and the storing the capabilities mapping table.

13. A computer program product comprising a computer readable storage medium having program instructions embodied therewith, the program instructions executable by a computing device to cause the computing device to:
- receive a service request from a client device to be processed by one or more cognitive entities (CEs) of a plurality of CEs in a distributed network;
- determine capabilities criteria associated with the service request;
- identify one or more target CEs of the plurality of CEs to process the service request based on the capabilities criteria and the capabilities of each of the plurality of the CEs identified in a capabilities mapping table, wherein the capabilities mapping table maps each of the plurality of CEs to path, capability, and type of service request; and
- output the service request towards the one or more target CEs to cause the one or more target CEs to process the service request,
- wherein the capabilities of each of the plurality of CEs are determined by applying cognitive protocols to metadata included in respective responses.

14. A system comprising:
- a processor, a computer readable memory and a computer readable storage medium associated with a computing device;
- program instructions to discover respective capabilities of each of a plurality of cognitive entities (CEs) in a distributed network, wherein the discovering the respective capabilities comprises applying cognitive protocols to metadata to determine additional capabilities and proficiency levels of the respective capabilities and the additional capabilities;
- program instructions to generate a capabilities mapping table identifying the respective capabilities of each of the plurality of CEs;
- program instructions to receive a service request from a client device to be processed by one or more CEs of the plurality of CEs, wherein the service request identifies capabilities criteria;
- program instructions to identify one or more target CEs of the plurality of CEs to process the service request based on the capabilities criteria and the capabilities of each of the plurality of the CEs identified in a capabilities mapping table;
- program instructions to output the service request towards the one or more target CEs to cause the one or more target CEs to process the service request,
- wherein the program instructions are stored on the computer readable storage medium for execution by the processor via the computer readable memory.

15. The system of claim 14, where in the program instructions to discover the respective capabilities of each of the plurality of CEs further comprise:
- program instructions to output an initialization signal to each of the plurality of CEs;
- program instructions to output discovery request PDUs to each of the plurality of CEs;
- program instructions to receive responses to the discovery requests, wherein the responses to the discovery requests include the metadata and information identifying the respective capabilities of each of the plurality of CEs.

* * * * *